June 11, 1968
A. DREISIN
3,388,232
ELECTRICAL DISCHARGE MACHINING METHOD TO OBTAIN VERY
CLOSE CONCENTRICITIES ON A VALVE BODY
Filed April 22, 1965
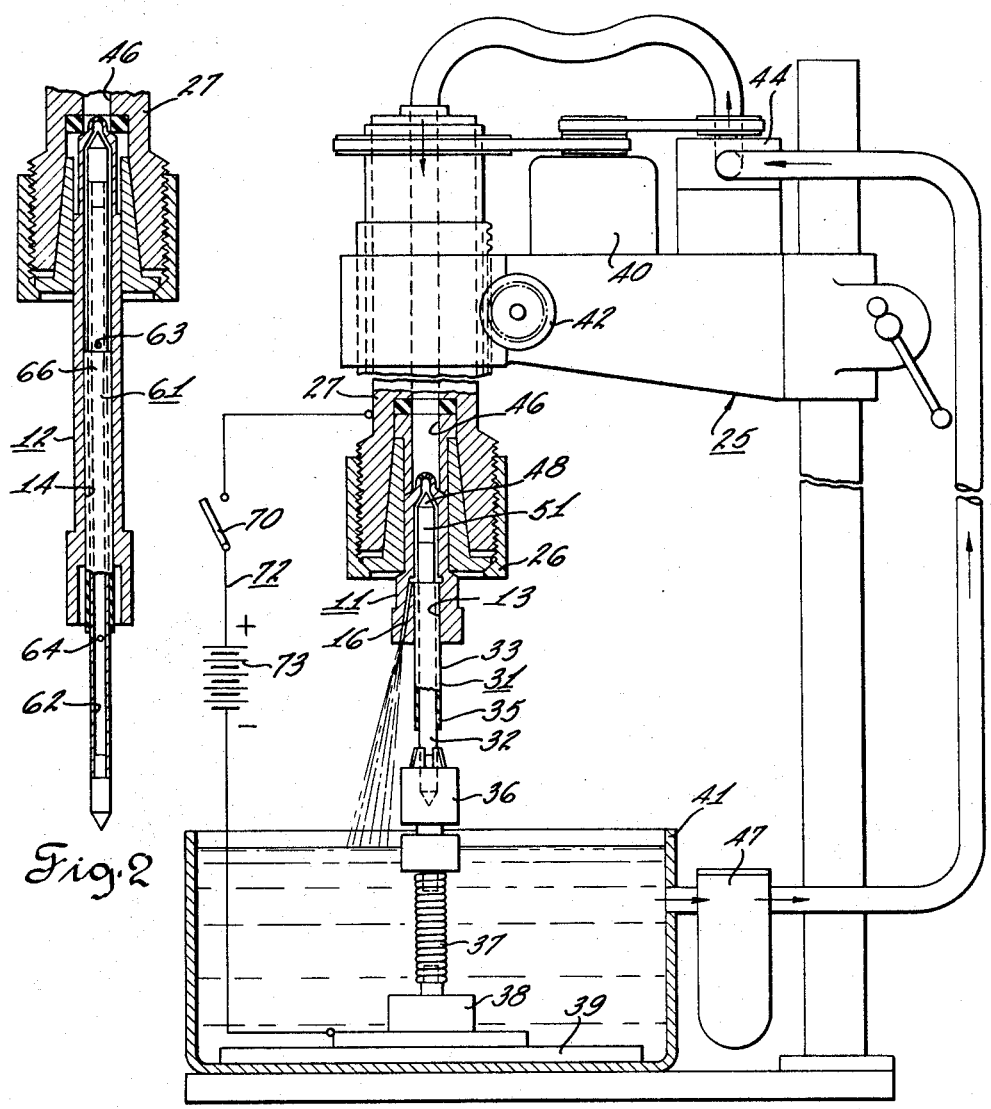
Fig. 2
Fig. 1
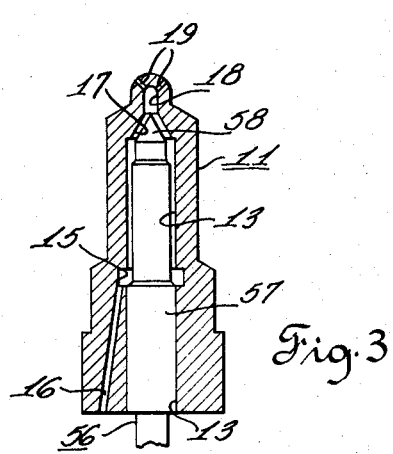
Fig. 3
Inventor
Alexander Dreisin
By Charles L. Schwab
Attorney

3,388,232
ELECTRICAL DISCHARGE MACHINING METHOD TO OBTAIN VERY CLOSE CONCENTRICITIES ON A VALVE BODY

Alexander Dreisin, Olympia Fields, Ill., assignor to Allis-Chalmers Manufacturing Company, Milwaukee, Wis.
Filed Apr. 22, 1965, Ser. No. 450,054
5 Claims. (Cl. 219—69)

ABSTRACT OF THE DISCLOSURE

A valve or nozzle body is bored and the bore is machined to a fine finish. An electroerosion electrode having a conical tip for machining and surface-finishing a coaxial valve seat is coaxially guided in the bore by an insulating sleeve thereon snugly fitting a portion of the bore. The electrode and the body have passages for circulation of dielectric gap-flushing liquid therethru.

---

This invention relates to a method of manufacturing a valve body including electrical discharge machining a pair of annular surfaces to obtain close concentricity. More specifically this invention relates to a new method of forming a valve seating surface in a valve body or housing.

Electrical discharge machining is a process of removing material by passing electrical current between an electrode and the part to be machined at a sufficiently high current concentration to produce an erosion of the machined part. Eroded particles are transported away from the machined area by the flow of a dielectric coolant. This invention is concerned with the employment of the electrical discharge machining principle to accurately machine an annular seat on a fuel injection valve body which, for proper functioning, must be concentric with a cylindrical bore of the body to an extremely close concentricity tolerance. Heretofore, in manufacturing valve bodies, the bore thereof has been ground and then a conical seat is formed at the end of the bore by an internal grinder. Next the cylindrical bore is finished by honing a lapping to produce a surface which does not deviate more than about twenty millionths of an inch from a true cylinder. Subsequently the conically recessed seat is finished to provide a seating surface for a reciprocal valve element by the use of a dummy lap, the technique of which is well known to those technicians familiar with the art to which this invention pertains.

This prior method of machining a conical seating surface has limitations due to the requirement of introducing a grinding stone to the inner conical recess of the nozzle or valve body. This poses a limitation on the length of the valve body inasmuch as the grinding stone is supported on a cantilevered spindle and must rotate at speeds in excess of sixty thousand revolutions per minute in order to produce a satisfactory grinding action. This prior art process is expensive and limits the length of the nozzle body which may be economically manufactured with the precision desired.

It is an object of the present invention to provide an improved method of manufacturing a valve body using an electrical discharge machining process.

It is a further object of this invention to provide a novel method of machining a valve body wherein a valve seat is formed by electrical discharge machining with an electrode having an exterior cylindrical surface in close fitting relation to a cylindrical bore of the valve body.

It is a further object of this invention to provide a new machining process as outlined in the previous objects and wherein a dielectric coolant is passed through the spray holes of the nozzle body during electrical discharge machining.

These and other objects and advantages of this invention will be apparent to those familiar with the art when the following description is read in conjunction with the drawings in which:

FIG. 1 is an elevation view of an electrical discharge machining apparatus;

FIG. 2 is a section view of a portion of the electrical discharge machine apparatus of FIG. 1, but employed in machining a long valve body; and FIG. 3 is a section view of the valve body being machined in FIG. 1, with its reciprocal valve element inserted.

Referring to the drawings the short valve body 11, shown in FIGS. 1 and 3, and long valve body 12, shown in FIG. 2, may both be advantageously machined by the method of this invention. The steps in machining the two valve bodies 11 and 12 are basically the same, although the flow route of the dielectric cooling fluid during machining is different. Each of the valve nozzle bodies 11, 12 is initially machined by conventional methods to provide a partially machined body having the bores 13, 14 in a rough machined state. The recess 15, is machined in valve body 11 and the bypass passage 16 is drilled at the angle illustrated connecting the end of the nozzle body with the recess 15. An annular valve seat 17 is formed at one end of the bore 13, in approximate concentric relation to the rough formed bore 13. The tip passage 18 is also formed at the end of the bore 13 and in addition very small spray holes 19 are drilled at desired positions of angularity in relation to the axis of bore 13. These spray holes are not nearly as large as those illustrated.

The nozzle bodies are next heat treated to obtain suitable hardness. Then the cylindrical bore 13 is ground using an internal grinding machine. This provides a semi-finished condition of the bore. Next the cylindrical bore 13 is lapped in a conventional manner to provide a finely finished bore of accurate cylindrical shape.

The machined parts are separated into groups by variations in their lapped cylindrical bore diameter. The grouping may be by stepped diameter variations of 0.0002 inch, for instance.

After the foregoing steps have been carried out, the nozzle body is positioned in the chuck 26 of the electrical discharge machine 25 which is equipped with a rotating spindle 27. The valve body is now ready for the electrical discharge machining operation. An electrode 31 is provided with a central cylindrical electrically conducting portion 32 and an outer cylindrical surface 33 which is electrically insulated from the conducting portion 32. In the illustrated embodiment of the invention, the cylindrical surface 33 is very accurately machined on a sleeve 35 of insulating material. The electrodes are separated into groups matching the groups of the valve bodies previously referred to. In other words the valve bodies and electrodes are matched so that there is a minimum clearance between the insulated outside diameter of the electrode and the lapped internal diameter of the nozzle or valve body bore 13. An electrode tip 51 of tungsten copper carbide is secured to the end of portion 32 and a conical surface 48 machined thereon. The conical surface 48 is complementary to the shape desired for the valve seat 17. The lower end of the electrode 31 is mounted in a chuck 36 secured to the upper end of a coil spring 37 which permits the electrode to center itself in the nozzle bore 13. The lower end of the coil spring 37 is connected to a base 38 which rests on an insulating board 39. The base 38 is magnetic, thus maintaining itself in place by its attraction to the metallic tank 41 during the electric discharge machining operation.

During the step of electrical discharge machining, the spindle is rotated, by drive means including motor 40, and is lowered as by rotation of hand wheel 42. The switch 70 must be closed to energize the electrical circuit 72 which includes a suitable electrical energy source 73. Pump 44, also driven by motor 40, draws dielectric fluid from the tank 41 via filter 47 and delivers it to the bore 46 of the spindle 27. The fluid passes downwardly through the central opening 46, thence through the spray holes 19 in the nozzle body 11, thence between the conical surface 48 and the conical seating surface 17. The dielectric fluid, after passing between these last mentioned faces, moves down along the reduced diameter portion 32 of the spindle into recess 15 and thence through the fuel supply passage 16, discharging therefrom into the tank 41. As the tip 51 is brought into close proximity to the seat 17, the surface thereof will be eroded away to provide a finely finished conical seat which is accurately concentric to the bore 13. The dielectric fluid cools the electrode and valve body and carries the eroded particles away from the area of electrical discharge machining. Directing the coolant downwardly through the spray holes 19 avoids their being clogged with eroded particles.

The electrode 31 is made of a metal which exhibits the least amount of wear in the electrical discharge machining process. Tungsten copper carbide has been found to be a suitable material. The insulated portion 33 may be ceramic or plastic, or any other material with good electrical insulating properties and with good adhesion to the metal of the electrode.

As shown in FIG. 3, the fuel injector valve 56 has an enlarged cylindrical portion 57 with an outside diameter lapped to a very accurate roundness and to a close tolerance so that it has a fluid tight fit with the accurately machined bore 13 of the nozzle. The tip of the nozzle valve 56 is conically formed in concentric relation to the cylindrical portion 57. Thus, since the conical seat 17 is concentric with the bore 13 of the nozzle body, the valve will accurately seat.

The electrode 61 shown in FIG. 2 is provided with an interior central passage 62 and openings 63, 64 to allow passage of dielectric coolant downwardly from the space above the enlarged diameter portion 66 to an appropriate receptacle. The nozzle body 12 does not have a fuel supply passage comparable to passage 16 in nozzle body 11, hence the need for the alternative way to pass coolant through the nozzle body during electrical discharge machining.

Although the method of this invention is advantageously used to machine fuel injection nozzle bodies which are of short length, this method is particularly useful in machining long narrow nozzle bodies having an interior cylindrical valve sealing surface at one end and a valve seat at the other end which must be concentric to the cylindrical surface to achieve proper nozzle operation. Such a nozzle body is illustrated in FIG. 2.

The embodiments of the invention for which an exclusive property or privilege is claimed are defined as follows:

1. A method of forming a valve body comprising the steps of:
    forming a valve body with a fluid passageway therethrough having a portion with a cylindrical bore and a concentric reduced diameter portion defining a valve seat,
    finish machining said bore to a very fine finish and to a highly accurate cylindrical shape, and
    electrical discharge machining the valve seat on said reduced diameter portion to a very fine finish and concentric to said bore by aligning an electrode having an insulated exterior cylindrical surface with a very close fit within said bore and a tip concentric to said exterior cylindrical surface and complementary to the desired finished shape of the valve seat being formed, and rotating said body and electrode relative to one another during said electrical discharge machining.

2. A method of manufacturing a valve body comprising the steps of:
    forming a valve body with a central cylindrical bore open at one end and a recessed surface defining a tapered valve seat surface at the other end of said bore in concentric relation to the latter,
    finish machining said bore to a very fine finish and to a highly accurate cylindrical shape and
    subsequently finish machining said valve seat surface by electrical discharge machining by aligning an electrode having an insulated outer cylinder surface with a very close fit within said bore of said body and a tapered tip concentric to the outer cylindrical surface and complementary to said valve seat surface, and rotating said nozzle body and electrode relative to one another and bringing said tip into close proximity to said valve seat surface during the electrical discharge machining of the latter.

3. A method of manufacturing a fuel injection nozzle body comprising
    forming a nozzle body with passage means opening at one end including a central cylindrical bore and a recessed surface defining a tapered valve seat surface at the other end of said bore in concentric relation to the latter,
    forming spray holes in said body in fluid communication with said bore by way of said seat,
    finish machining said bore to a very fine finish and to a highly accurate cylindrical shape,
    subsequently finish machining said valve seat surface by electrical discharge machining by aligning an electrode having an insulated outer cylindrical surface with a very close fit within said bore of said body and a tapered tip concentric to the outer cylindrical surface and complementary to said valve seat, rotating said nozzle body and electrode relative to one another and bringing said tip into close proximity to said valve seat surface during the electrical discharge machining of the latter, and
    directing dielectric fluid through said spray holes thence between said tip and valve seat surface and thence through said passage means during said electrical discharge machining.

4. A method of manufacturing a fuel injection nozzle body comprising the steps of:
    forming a passageway therethrough including a cylindrical bore adjacent one end of the passageway,
    a recessed surface defining a tapered valve seat surface adjacent the other end of said passageway in concentric relation to said bore, and
    spray holes in said body at said other end of said passageway,
    forming passage means extending between the exterior of said body and a point in said passageway intermediate said bore and said seat surface,
    finish machining said bore to a very fine finish and to a highly accurate cylindrical shape,
    subsequently finish machining said valve seat surface by electrical discharge machining by aligning an electrode having an insulated outer cylindrical surface with a very close fit within said bore of said body and a tapered tip concentric to the outer cylindrical surface and complementary to said valve seat surface, rotating said nozzle body and electrode relative to one another and bringing said tip into close proximity to said valve seat surface during the electrical discharge machining of the latter, and
    directing dielectric fluid through said spray holes, thence between said tip and valve seat surface and thence through said supply passage during said electrical discharge machining.

5. A method of manufacturing a fuel injection nozzle body including
    forming a nozzle body with a central cylindrical bore open at one end and a recessed surface defining a tapered valve seat at the other end of said bore in concentric relation to the latter, forming spray holes in said body in fluid communication with said bore by way of said seat, finish machining said bore to a very fine finish and to a highly accurate cylindrical shape, subsequently finish machining said valve seat by electrical discharge machining by aligning an electrode having an insulated outer cylindrical surface with a very close fit within said bore of said body, positioning a tapered tip of said electrode which is concentric to the outer cylindrical surface and complementary to said valve seat in close proximity to said valve seat, and an internal fluid passage connecting exterior points of said electrode on opposite axial ends of said cylindrical surface, rotating said nozzle body and electrode relative to one another during said electrical discharge machining of said valve seat, and directing dielectric fluid through said spray holes, thence between said tip and valve seat and thence through said internal fluid passage during said electrical discharge machining.

References Cited

UNITED STATES PATENTS

| | | |
|---|---|---|
| 1,214,244 | 1/1917 | Waltz. |
| 2,385,665 | 9/1945 | Warwick 219—69 |
| 2,693,055 | 11/1954 | Frey 51—27 |
| 3,309,303 | 3/1967 | Bender et al. 219—69 X |

RICHARD M. WOOD, *Primary Examiner.*

R. F. STAUBLY, *Assistant Examiner.*